United States Patent
Bittermann

[11] 4,031,314
[45] June 21, 1977

[54] ARRANGEMENT FOR CONNECTING INFORMATION TRANSDUCERS IN PROGRAM CONTROLLED PROCESSING SYSTEMS

[75] Inventor: Hans Bittermann, Munich, Germany

[73] Assignee: Siemens Aktiengesellschaft, Munich, Germany

[22] Filed: Jan. 5, 1976

[21] Appl. No.: 646,538

Related U.S. Application Data

[63] Continuation of Ser. No. 576,276, May 12, 1975, abandoned, which is a continuation of Ser. No. 419,230, Nov. 27, 1973, abandoned, which is a continuation of Ser. No. 225,800, Feb. 14, 1972, abandoned.

[30] Foreign Application Priority Data

Feb. 12, 1971 Germany .......................... 2106730

[52] U.S. Cl. ................................ 178/3; 179/18 ES
[51] Int. Cl.² .......................................... H04Q 3/54
[58] Field of Search ........... 178/3, 2 R, 70 R, 71 R, 178/73; 179/16 F, 16 EA, 16 E, 18 ES

[56] References Cited

UNITED STATES PATENTS

| | | | |
|---|---|---|---|
| 3,424,859 | 1/1969 | Bialo et al. ............................ | 178/3 |
| 3,469,021 | 9/1969 | Damlblom et al. ................ | 178/2 R |
| 3,525,814 | 8/1970 | Cox ................................ | 179/18 ES |
| 3,564,499 | 2/1971 | Ryan ................................ | 178/3 X |

Primary Examiner—Thomas W. Brown
Attorney, Agent, or Firm—Gerald L. Lett

[57] ABSTRACT

A circuit arrangement for connection of information transducers, which may be compensating networks in program controlled telecommunication exchange systems is described. In the system the transfer of information between the feeder and consumer lines connected to a line connection unit always occurs over a central memory. The storage areas in the central memory, which are connected to feeder lines, can be reached over input code transducers and contain an address datum identifying the desired outgoing or consumer lines. By means of the address datum, the consumer lines can be reached over output code transducers. Compensating networks are connected at the input end to the outputs of the output code transducer and at the output end to inputs of the input code transducer. Applicable outputs of the output code transducer can be reached over an address datum contained in an associated storage area. Specific storage areas connected to applicable inputs of the input code transducer can be reached over these inputs. These storage areas each contain an address datum identifying the desired consumer line.

3 Claims, 1 Drawing Figure

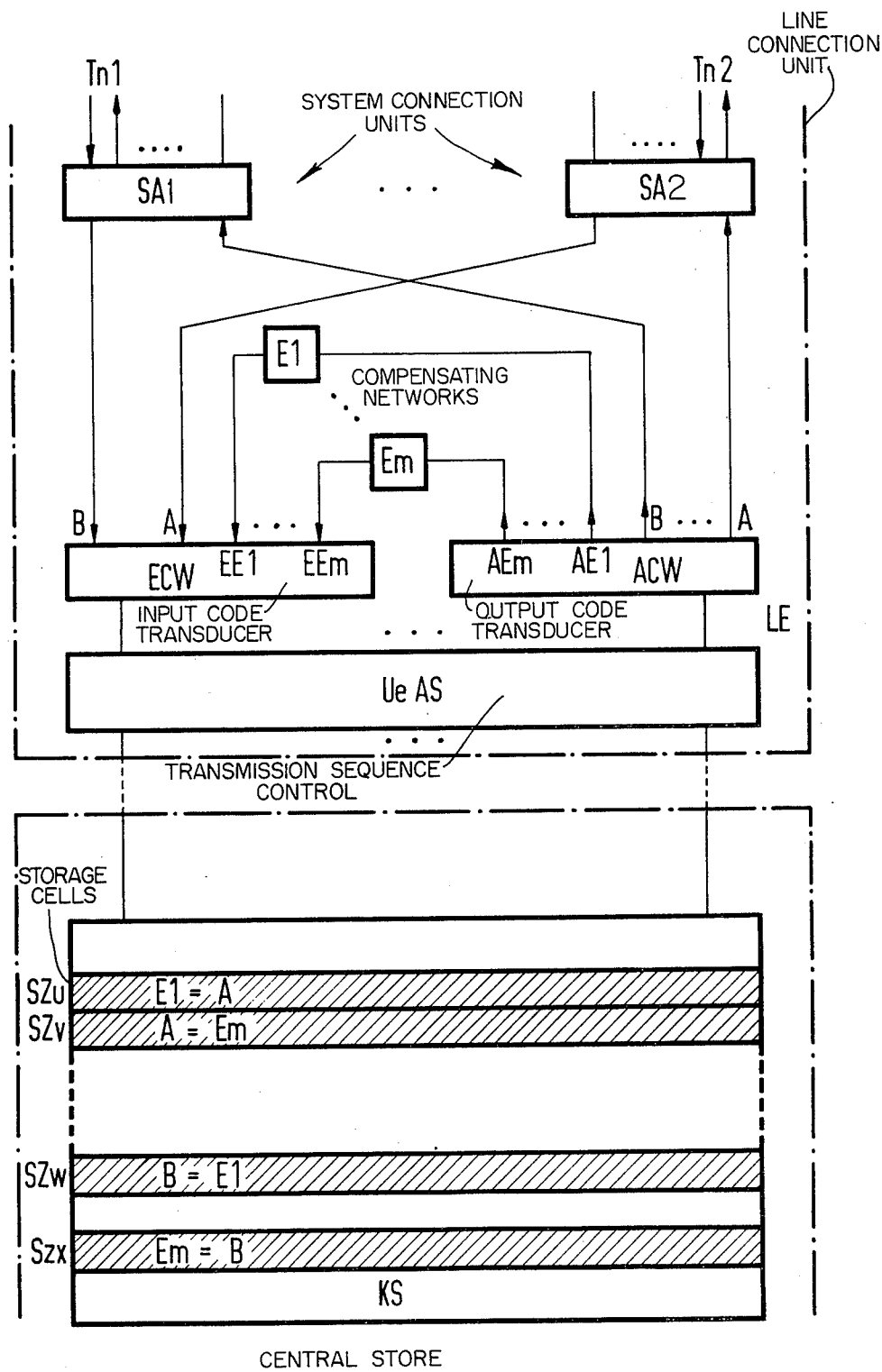

ARRANGEMENT FOR CONNECTING INFORMATION TRANSDUCERS IN PROGRAM CONTROLLED PROCESSING SYSTEMS

This is a continuation of application Ser. No. 576,276, filed May 12, 1975, which is a continuation of application Ser. No. 419,230, filed Nov. 27, 1973, which is a continuation of application Ser. No. 225,800, filed Feb. 14, 1972.

BACKGROUND OF THE INVENTION

The invention relates to a circuit arrangement for connecting information transducers in a program controlled data processing system, in particular a program controlled telecommunication switching system.

In such systems, the transfer of information between the input and output lines connected to a line connection unit always occurs over a central memory. The storage areas in the central memory are connected to the input lines and can be reached over input code transducers. Each corresponding storage area contains an address datum determining the desired consumer or output line, and under the influence of the latter address datum, consumer line can be reached over output code transducers.

In a program controlled data processing system employed as a dial exchange system, which has recently become known, the incoming connections, the so-called feed lines (incoming lines), and the outgoing connections, the so-called consumer lines, are connected to a line connection unit. The input code transducer and the output code transducer are an essential component of this line connection unit, to which the feed and consumer lines are connected over system connection units. The system unit has access, over a control device attached to the line connection unit, to a central store, which contains a core store as an essential component, along with the control equipment. This system is described in an article entitled *EDS - A New Electronic Data Switching System for Data Communication*, in the publication "Nachrictentechnische Zeitschrift", (1969), No. 8, pages 444 to 463. (The latter publication is printed in the English language.) Further, the latter mentioned control equipment is described, as well, in commonly assigned U.S. application Ser. No. 870,298, now abandoned, and U.S. Application Ser. No. 233,662, which is a continuation in part of the latter application now U.S. Pat. No. 3,775,754.

In such a system a transmission of information between feed and consumer lines takes place in a manner such that each polarity change within a binary message is directed to the central memory or store and there entered in a storage region associated with the feed line; this region is called a storage cell in the following. This storage cell contains, along with other information, the address of the consumer line for which the information is intended. The indentification of requesting feed lines, or the feed lines which present a piece of information, e.g., a polarity change, occurs in the input code transducer. The storage cell in the central store associated with this feed line is then controlled over the transmission sequence control of the line connection unit. On the basis of the dial information, which was fed into the central store during establishment of the connection over the feed line in the same manner, the address information is available there over the desired consumer line for the entire duration of a connection. To transmit the information between the feed line and the desired consumer line, the address of the desired consumer line is given to the output code transducer once again over the transmission sequence control. The identification of the consumer lines then takes place in the output code transducer.

It is often necessary to switch information transducers, for example, coding or decoding devices or compensating networks into a connection. In particular the switching in of the compensating networks is frequently of considerable importance, since the transmission characteristics of the lines connected to an exchange system can be influenced by disturbances either continuously or from time to time. It is known to attach the compensating networks permanently to the lines, although this results in the disadvantage that inefficient use is made of networks due to the cyclic fluctuation of traffic. Further, there is the disadvantage that when a compensating network fails, the line connected thereto is rendered inoperative.

It is an object of the invention to provide a circuit arrangement with which signal transducers, in particular, compensating networks, can be connected to the feed and consumer lines directed over a program controlled exchange system, whereby the above mentioned disadvantages are avoided.

SUMMARY OF THE INVENTION

In accordance with the invention, the forgoing and other objects are achieved in that the information transducers are connected on the input end to outputs of the output code transducer and on the output end to inputs of the input code transducer. The applicable outlets of the output code transducers can be reached by means of an address datum contained in the storage region associated with a feed line, and specific storage regions, which are associated with the applicable inputs of the input code transducer, can be reached over these inputs, which storage areas contain respectively an address datum specifying the desired consumer line.

Within the framework of the invention, these information transducers can be compensating networks, whose switching into a connection and whose attachment to a connection occurs in a program controlled manner, dependent on the transmission characteristics of the feed and/or consumer lines, whereby then the respective compensating network address datum is entered into the storage area connected to the fuel line and the respective consumer address datum is entered into the storage area associated with the connected compensating network.

BRIEF DESCRIPTION OF THE DRAWING

The principles of the invention will be more readily understood by reference to the description of a preferred embodiment given hereinbelow in conjunction with the single FIGURE drawing which is a schematic diagram of an exchange constructed according to the invention.

DETAILED DESCRIPTION OF THE DRAWING

The construction of the overall system described hereinbelow is like the one discussed in the prior art "EDS" article referenced hereinabove. Where further description is required reference may be made to that publication. Where there is deviation from this prior art system or where the reference is not sufficiently detailed, appropriate description is given herein.

The line connection unit LE shown in the upper part of the FIGURE contains a series of system connections or line adapters SA, to which the most different feeder and consumer lines are connected. The construction of a line connection unit such as the above, is known and is described in commonly assigned U.S. Pat. No. 3,717,723. Further, the input and output code transducers ECW and ACW are present, as well as a transmission sequence control U$e$AS. Details regarding the construction of the line connection unit LE including the input and output code transducers and the transmission sequence control may be found in U.S. Pat. No. 3,717,723. These components are fully described in the latter patent where they are identified by like references as are used herein. The central store S is shown symbolically for the whole storage unit in the lower portion of the FIGURE. The central store includes the storage unit KS which has a plurality of whose storage areas, for example storage cells, and these are denoted with SZ and a corresponding index, in the example $u$, $v$, $w$, $x$. For example, in the illustrated embodiment each system connection circuit is permanently allocated a specific storage location. The termination circuit SA1 is allocated to storage location SZ$v$ and the system connection SA2 is allocated the storage location SZ$u$. A simple conventional core storage may be used for storage unit KS. The line connection unit LE has access to the store over the outlets of the transmission sequence control U$e$AS, whereby for reasons of clarity the central control devices of the store are not shown. The information transducers, in the example the compensating networks E1 to E$m$, are arranged in accordance with the invention such that their outputs can be reached by the output code transducer ACW over the outlets AE1 to AE$m$. At the output end the compensating networks E1 to E$m$ can be connected to the equipment of the system over inputs EE1, EE$m$ of the input code transducer ECW. As will be described in greater detail hereinbelow, the interoperations of these compensating networks with the rest of the systems i.e., the manner of addressing and accessing, are like the described interoperations of the system connection units with the remainder of the system.

As stated, the construction and mode of operation of the line termination unit is illustrated in U.S. Pat. No. 3,717,723. This operation will now be described in order to illustrate the mode of operation of the aforementioned compensating networks in conjunction with the line termination unit. The arrival of a pulse signal or a polarity reversal on an incoming line to a system connection SA is detected therein. As discussed in U.S. Pat. No. 3,717,723, this is done by means of an evaluation circuit in which the condition of the line is compared with the condition of a bistable stage which is set appropriately with each polarity reversal. Upon detecting a polarity reversal, specified output circuits of a system connection are marked. These output circuits represent, respectively, a digit of the line number which is allocated to the appropriate system connection. If, for example, a four unit octal code is used, a specified output circuit is marked with thousands, hundreds, tens and units digits. In this way a unit of information in the form of a "one-out-of$n$" code is available for each digit of the line number. In the example, only one line is shown over which input B of input code converter ECW is seized. The binary address is obtained therefrom through code conversion and is entered in an input of the transmission sequence control U$e$AS, as discussed in the aforementioned patent. A storage location SZ$w$, permanently allocated to system connection SA1 herein, is accessed with a binary address in the known manner. The aforementioned storage location contains a unit of address information representing another specified line number. With the aid of this address, which is read out and transferred to an output register of the transmission sequence control, as illustrated in the aforementioned patent, a specified outgoing system connection can be determined. This occurs in output code converter ACW over a decoder which converts the binary address into the aformentioned code form. In accordance with the line number, thus obtained, output A of the output code converter can be marked. In this case a unit of information can then be sent over an output line from the accessed system connection.

According to the invention, information transducers or compensating networks can be supplied to be switched into the circuit instead of system connection circuits; these information transducers are each connected in the same manner as a system connection circuit to the inputs and outputs of input code converter ECW and output code converter ACW. Thus, each information transducer is allocated a specific storage location which is accessed by means of the line number of that transducer. Likewise, each information transducer is accessible from the storage over a specific terminal number. In the FIGURE a number $m$ transducers E1 to E$m$ are available to which are allocated the storage locations SZ$u$ and SZ$x$. The addresses for these information transducers or compensating networks are contained in specified storage locations. These are the storage locations allocated to such circuits which are particularly prone to interference. In the example, these are the lines over which the subscribers Tn1 and Tn2 are connected. In this way the storage location SZu allocated to system connection SA1 contains the address of the transducer E1 and the storage location SZx is allocated to the system connection SA2 and contains the address of information transducer EM.

The compensating networks E1 – Em may be of conventional construction. An example of an appropriate compensating network is to be found in the publication "Nachrichtentechnische Zeitschrift" (1958) No. 12, pages 610– 613. An equivalent of the circuit described in the latter publication is described in detail in U.S. Pat. No. 3,045,063. These devices contain a memory stage which accepts incoming information, and from which the information is retrieved by scanning at the correct time. Thus, by scanning with a properly timed interrogation pulse, data signals, which have been lengthened or shortened by distortion, appear at the output of the compensating network and are of their original duration.

For description of the manner of operation it is assumed that a subscriber Tn1 desires a connection to another subscriber Tn2. The line number at the input code transducer ECW, which is assigned to the user Tn1 who is calling, is denoted with B. The storage cell SZw is connected to this feeder line in the example. Without considering a compensating network which can be switched in, an address datum is contained in storage cell SZw, through which the consumer line leading to the subscriber, who is called, can be identified. In the present example that would be the line A, over which the line leading to subscriber Tn2 can be reached from the output code transducer ACW over the system connection unit. This association between the subscriber who is calling and the one who is called is present in the central store for the entire duration of the connection. If a transmission of information is necessary in the direction from subscriber, who is called, to the subscriber who calls, then the association between the feeder line coming from the subscriber Tn2, who is called, and the consumer line leading to the subscriber Tn1, who is calling, is also contained in the central store. In this regard, a storage cell is, likewise, assigned to the line number denoted at the input code transducer ECW, with A, in which the address of the consumer line denoted at the output code transducer ACW with B is entered.

Under the condition, for example, because of the use of an interference-prone input line to system connection SA from subscriber Tn1, that the described connection between the subscriber Tn1 and the subscriber Tn2 necessitates the switching-in of a compensating network, which for example is determined on a program-controlled basis, the storage cell SZw assigned to the line number B contains the line number of compensating network in the explanatory example the line number of the compensating network E1. As indicated, the latter has a specific line number, exactly as does a system connection circuit. This number is obtained from the address (contained in the storage location SZw) in the output code converter ACW in the same manner as occurs for a system connection circuit. The compensating network E1 can be reached over the thus determined outlet AE1 of the output code transducer ACW. Since it is connected to an input of the input code transducer ECW, thus, a specific line number is also assigned to this input, a storage cell can once again be reached. The transfer of a unit of information, i.e., the transfer of a polarity reversal, is not carried out, between the storage and a system connection circuit, but between the storage and the addressed information transducer E1. After the information has been converted, (for example, if the polarity reversal has been delayed in time) the polarity reversal processed is available at the output of information transducer E1. This is shown by the seizure of the input EE1 of the input code converter ECW. Again, a binary storage address is provided thereby in the input code converter, i.e., the storage address for the storage location permanently allocated to the information transducer E1. At the same time the processed information is transferred to the storage location SZu. The latter storage location now contains the address for the outgoing line which is connected to sysem connection circuit SA2. This address is transferred to the output code converter ACW and causes therein a seizure of output line A connected to system connection circuit Sa2.

In this explanatory example the storage cell assigned to this input EE1 is the storage cell SZu, in which the line number A is entered as consumer address, over which now the desired consumer line leading to the subscriber Tn2, who is called, is reached. The same applies for the data to be transmitted in the opposite direction. Thus, in a first storage cell SZv, which is assigned to the line number A at the input code transducer ECW, the line number stands as a consumer address, over which compensating network, in the example the network Em, can be reached. At the output end, the network is connected to the input EEm, at the input code transducer ECW. In the storage cell assigned to it, in the example in the storage cell SZx, the line number B is present as address for the consumer line leading to the user, who is calling, which is identified after transfer to the output code transducer ACW and which enables the transfer of information to the thus determined consumer line leading to subscriber Tn1.

The solution according to the invention offers the possibility as assigning freely the centrally placed compensating networks to the receiving equipment of the lines. No auxiliary devices, such as coupling devies for example, are necessary. Through the associations present in the central store it is possible to have the data to be transmitted coupled over one of the compensating networks only if necessary. The decision, whether a connection is to be made over a compensating network, or whether it can be established without switching one in, can be controlled through the exchange program without notable expense. This possibility results from the fact that only an entry storage cells of the central storage is necessary.

The control lines to each transmission device at the output code transducer, which are present for changing polarity and repolarizing of the hybrid circuit of semi-duplex lines, can be used to control the compensating network. For the case that several control lines are necessary, it is possible without notable expense to use further connections of the output code transducer for transmission of control signals to the individual compensating networks.

The description of a preferred embodiment of the invention given hereinabove is only exemplary of the principles of the invention and does not define the scope of the invention. The scope of the invention is defined by the appended claims.

I claim:

1. A circuit arrangement for connecting information transducer means in a program controlled telecommunication switching system in which the transfer of information between incoming and outgoing line means occurs over a central memory, said line means being connected to a line connection unit, said central memory including a plurality of storage areas allocated to given incoming line means and accessible over input code transducers, each said storage area containing an address datum identifying an outgoing line means, each said outgoing line means being accessed, by means of said address datum, over an output code transducer, the circuit arrangement comprising:
   a plurality of information transducer means having, respectively, input and output terminals, said input terminals being connected to outputs of said output code transducers, said output terminals being connected to inputs of said input code transducers,
   each said information transducer means being identified by data accessible through an address contained in one of said storage areas allocated to an incoming connection through an incoming lines means,
   the address identifying an outgoing connection being contained in the one of said storage areas allocated to the connected one of said information transducer means.

2. The circuit arrangement defined in claim 1 wherein said information transducer means comprises a compensating network for removing distortion from data signals.

3. The circuit arrangement defined in claim 1 further comprising means for switching said information transducer means into said connections to said input and output code transducers under the control of a program.

* * * * *